United States Patent
Kimura

(10) Patent No.: US 9,599,800 B2
(45) Date of Patent: Mar. 21, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Kohei Kimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/993,155

(22) Filed: Jan. 12, 2016

(65) Prior Publication Data
US 2016/0209631 A1      Jul. 21, 2016

(30) Foreign Application Priority Data
Jan. 21, 2015   (JP) .................................. 2015-009250

(51) Int. Cl.
G02B 15/14    (2006.01)
G02B 15/173   (2006.01)
G02B 27/00    (2006.01)

(52) U.S. Cl.
CPC ....... G02B 15/173 (2013.01); G02B 27/0025 (2013.01)

(58) Field of Classification Search
CPC .................................................... G02B 15/173
USPC ........................................................ 359/686
See application file for complete search history.

(56) References Cited

U.S. PATENT DOCUMENTS

| 7,903,345 B2 | 3/2011 | Nurishi |
| 2010/0085647 A1* | 4/2010 | Nurishi ............... G02B 15/173 359/687 |

FOREIGN PATENT DOCUMENTS

| JP | 2010032700 A | 2/2010 |
| JP | 2010091788 A | 4/2010 |

* cited by examiner

*Primary Examiner* — James Jones
(74) *Attorney, Agent, or Firm* — Rossi, Kimms & McDowell LLP

(57) ABSTRACT

Provided is a zoom lens, including, in order from an object side to an image side: a first lens unit having a positive refractive power; a second lens unit having a negative refractive power; a third lens unit having a positive refractive power; and a rear lens group including at least one lens unit, in which an interval between each pair of adjacent lens units is changed during zooming, and materials of lenses included in a lens unit arranged closest to the image side are appropriately set.

14 Claims, 11 Drawing Sheets

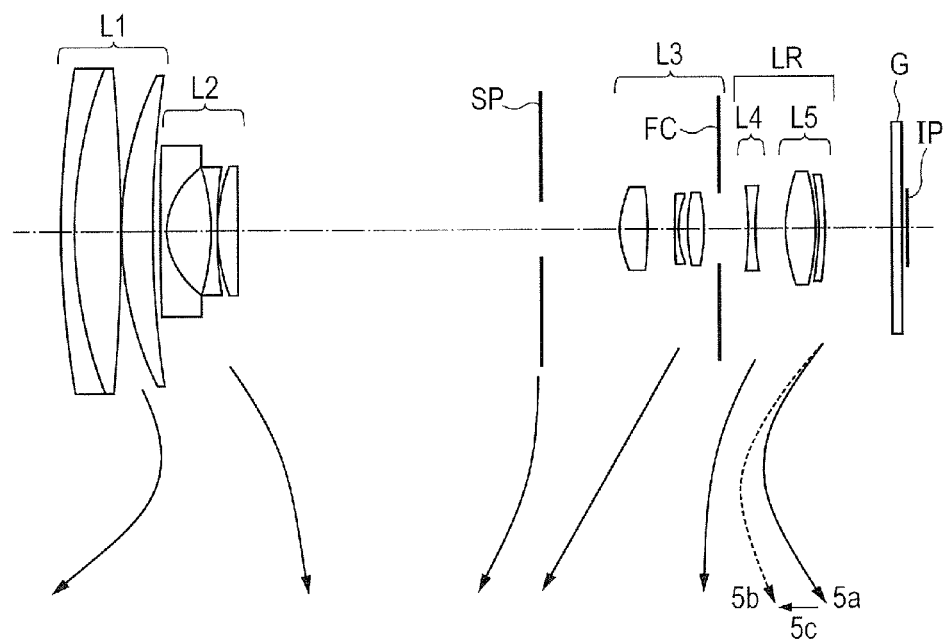
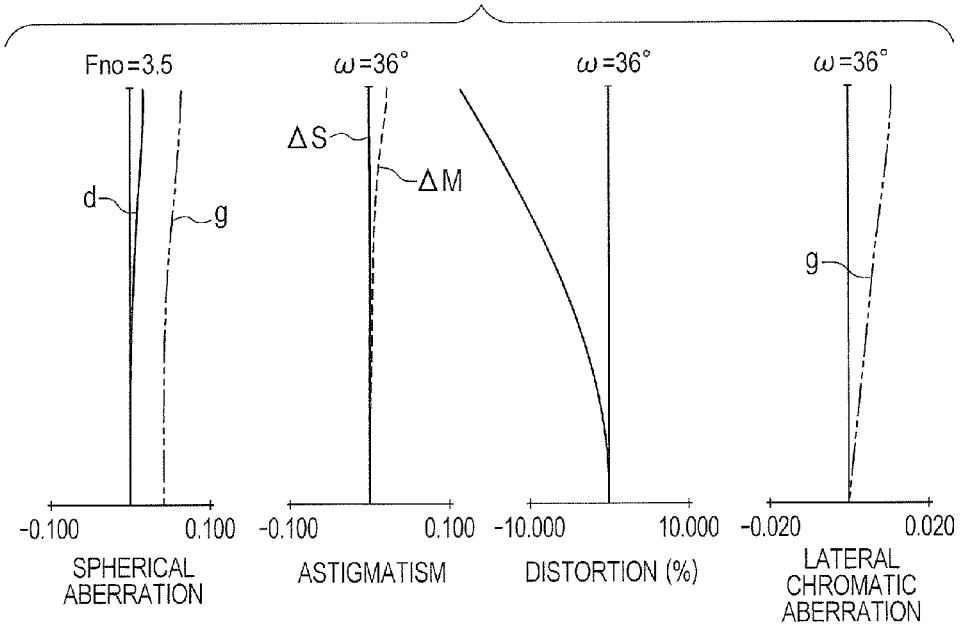

ZOOM LENS AND IMAGE PICKUP APPARATUS INCLUDING THE SAME

BACKGROUND OF THE INVENTION

Field of the Invention

The present invention relates to a zoom lens, which is suitable for, for example, an image pickup optical system used in an image pickup apparatus such as a digital still camera, a video camera, a monitoring camera, a broadcasting camera, a silver-halide film camera, or the like.

Description of the Related Art

In recent years, image pickup apparatus using solid-state image pickup elements or silver-halide films have been increased in functionality while the entire apparatus have been reduced in size. As image pickup optical systems to be used in those image pickup apparatus, a small zoom lens having a high zoom ratio, a wide angle of view, and high optical performance over an entire zoom range even in the periphery of a screen has been sought for. As a zoom lens that is small as the entire system and has a high zoom ratio, there has been known a positive lead type zoom lens including, in order from an object side to an image side, a first lens unit having a positive refractive power, a second lens unit having a negative refractive power, a third lens unit having a positive refractive power, and a rear lens group including at least one lens unit arranged subsequently to the third lens unit.

In a zoom lens, aberration that has occurred in a first lens unit is enlarged by a second lens unit and subsequent lens units. Thus, when a higher zoom ratio is realized, it is important to suppress aberration occurring in the first lens unit as much as possible. Among various aberrations occurring in the first lens unit, aberration that occurs in a large amount is the secondary spectrum of axial chromatic aberration at a telephoto end.

Hitherto, in order to suppress the secondary spectrum of axial chromatic aberration at a telephoto end, a low dispersion material having high relative partial dispersion has been used for a positive lens in a first lens unit. Moreover, in order to correct the above-mentioned secondary spectrum of the axial chromatic aberration that has occurred in the first lens unit, a material having high relative partial dispersion has been used for a positive lens in a third lens unit having a positive refractive power.

In Japanese Patent Application Laid-Open No. 2010-91788, there is disclosed a zoom lens having a high zoom ratio in which anomalous dispersion materials are used as materials of positive lenses in a first lens unit and a third lens unit, to thereby satisfactorily correct the secondary spectrum of chromatic aberration. In Japanese Patent Application Laid-Open No. 2010-32700, there is disclosed a zoom lens in which a third lens unit includes a lens formed of a material having an anomalous dispersion characteristic.

When a material having a strong anomalous dispersion characteristic is used to suppress the secondary spectrum of axial chromatic aberration at a telephoto end as in the zoom lenses disclosed in Japanese Patent Application Laid-Open No. 2010-91788 and Japanese Patent Application Laid-Open No. 2010-32700, lateral chromatic aberration is increased at a wide angle end. In order to satisfactorily correct axial chromatic aberration and lateral chromatic aberration over an entire zoom range while realizing a higher magnification, it is important to appropriately set a power arrangement of each of lens units and materials of lenses in each of the lens units.

SUMMARY OF THE INVENTION

According to one embodiment of the present invention, there is provided a zoom lens, including, in order from an object side to an image side: a first lens unit having a positive refractive power; a second lens unit having a negative refractive power; a third lens unit having a positive refractive power; and a rear lens group including at least one lens unit, in which an interval between each pair of adjacent lens units is changed during zooming, in which a lens unit arranged closest to the image side includes at least two lenses, in which materials of all of lenses included in the lens unit arranged closest to the image side comprise a material satisfying the following conditional expression:

$$0.0 < \theta gFr - (-1.520 \times 10^{-7} \times vdr^3 + 5.213 \times 10^{-5} \times vdr^2 - 5.500 \times 10^{-3} \times vdr + 0.730),$$

where $\theta gFr$ and $vdr$ represent relative partial dispersion and an Abbe number of the material of the lens included in the lens unit arranged closest to the image, and in which the following conditional expression is satisfied:

$$12.0 < f1/fw < 40.0,$$

where $f1$ represents a focal length of the first lens unit, and $fw$ represents a focal length of the zoom lens at a wide angle end.

Further features of the present invention will become apparent from the following description of exemplary embodiments with reference to the attached drawings.

BRIEF DESCRIPTION OF THE DRAWINGS

FIG. 5 is a lens cross-sectional view of a zoom lens according to Embodiment 3 of the present invention.

FIG. 6A is an aberration diagram of the zoom lens according to Embodiment 3 of the present invention at a wide angle end.

DESCRIPTION OF THE EMBODIMENTS

Exemplary embodiments of the present invention are hereinafter described with reference to the attached drawings. A zoom lens according to the present invention includes, in order from an object side to an image side: a first lens unit having a positive refractive power; a second lens unit having a negative refractive power; a third lens unit having a positive refractive power; and a rear lens group including at least one lens unit. Intervals between adjacent lens units are changed during zooming.

Figure 1:
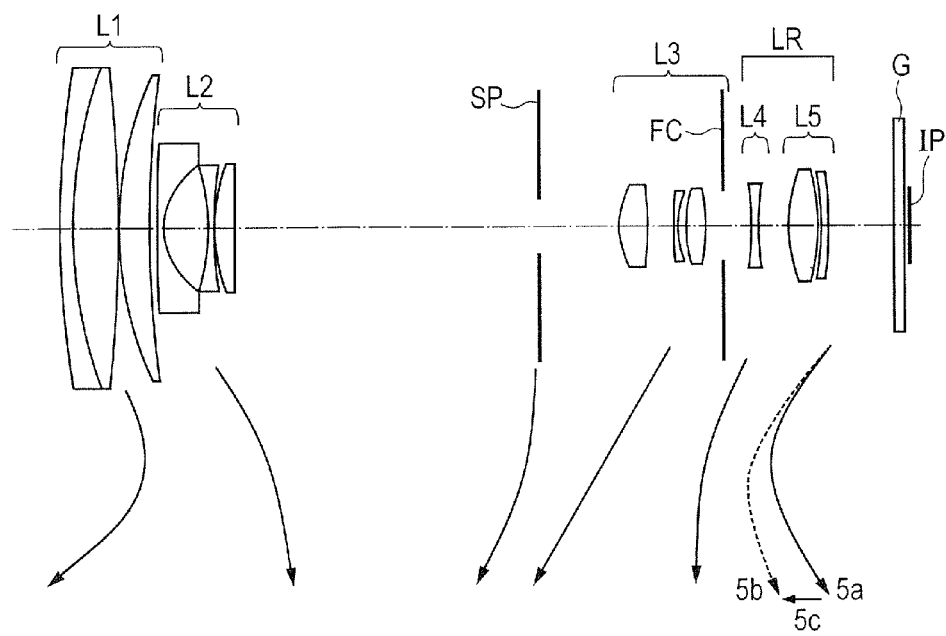
FIG. 1 is a lens cross-sectional view of a zoom lens according to Embodiment 1 of the present invention.
Figure 2A:
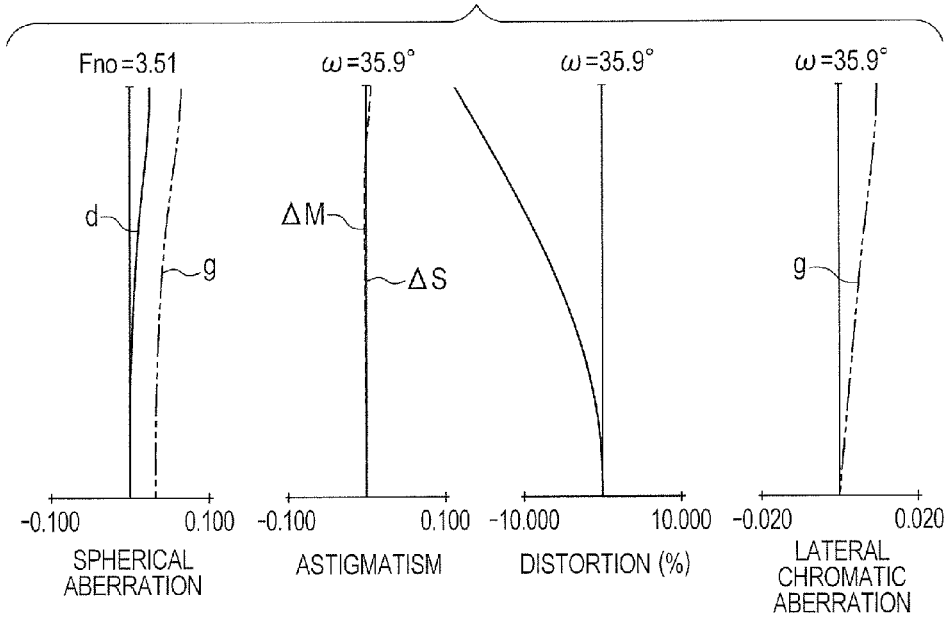
FIG. 2A is an aberration diagram of the zoom lens according to Embodiment 1 of the present invention at a wide angle end.
Figure 2B:
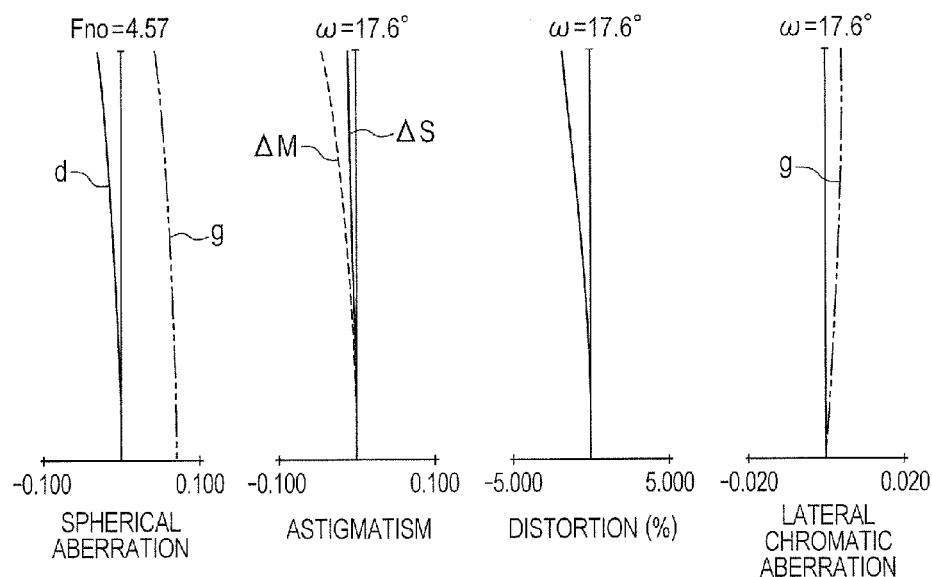
FIG. 2B is an aberration diagram of the zoom lens according to Embodiment 1 of the present invention at an intermediate zoom position.
Figure 2C:
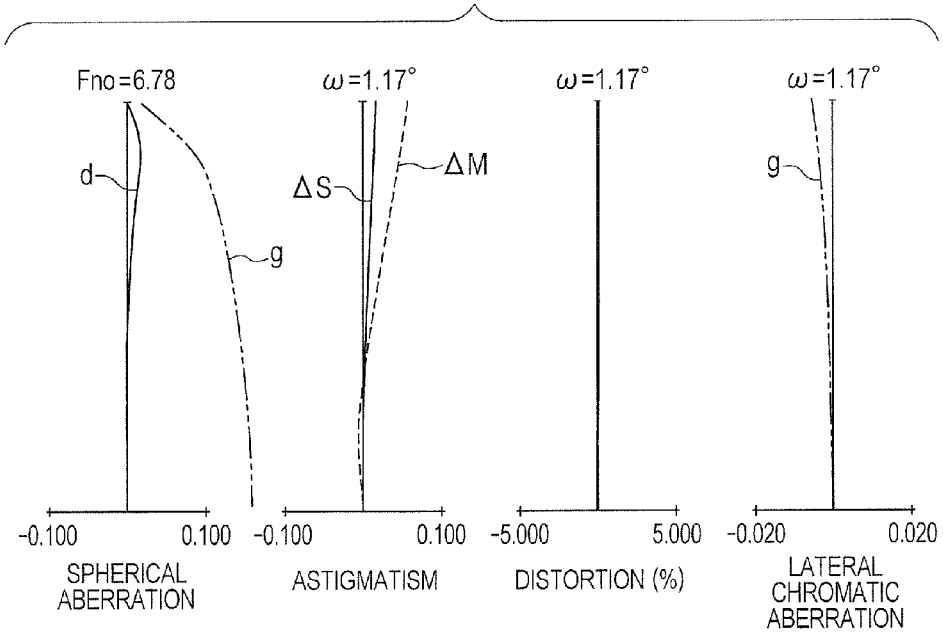
FIG. 2C is an aberration diagram of the zoom lens according to Embodiment 1 of the present invention at a telephoto end.
Figure 3:
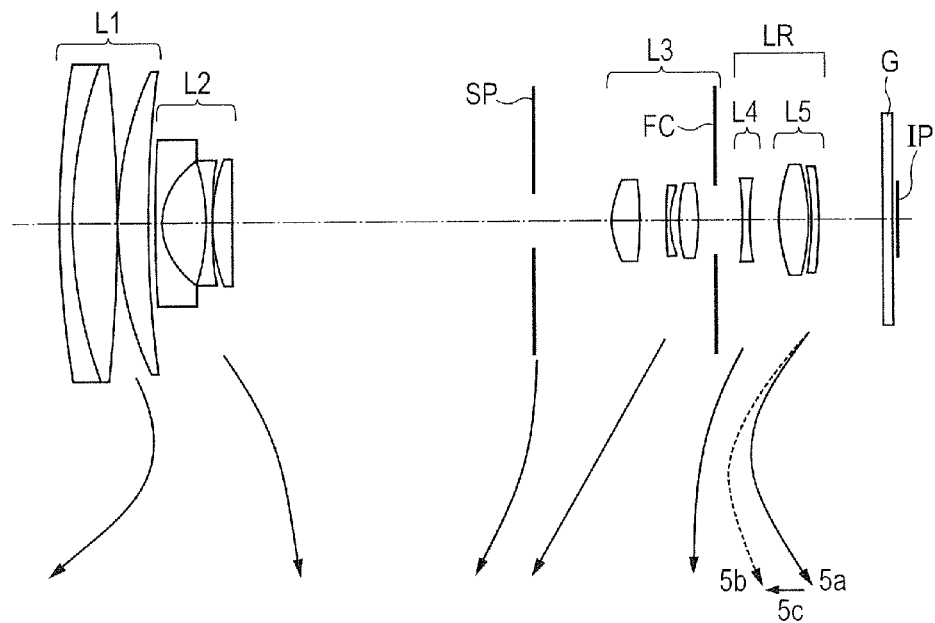
FIG. 3 is a lens cross-sectional view of a zoom lens according to Embodiment 2 of the present invention.
Figure 4A:
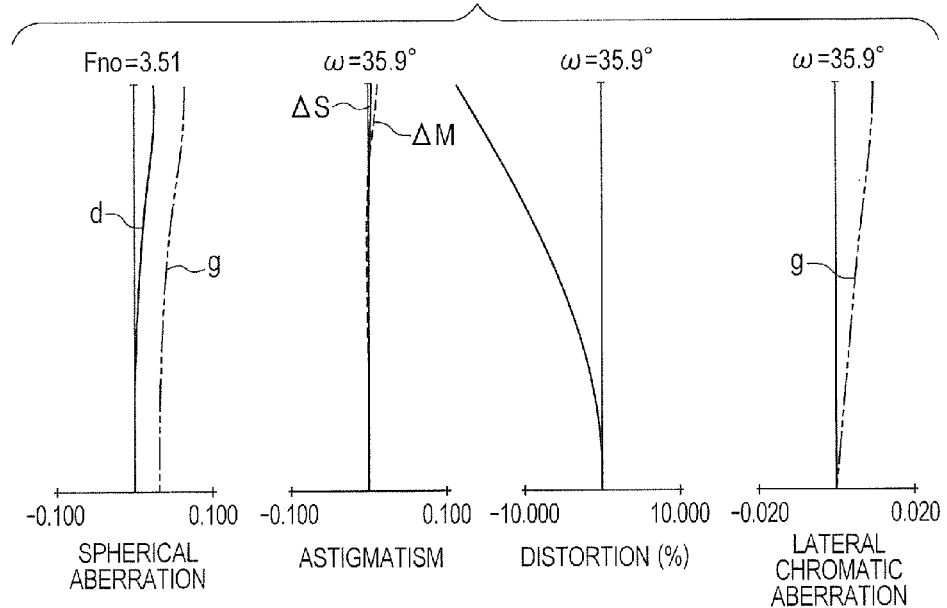
FIG. 4A is an aberration diagram of the zoom lens according to Embodiment 2 of the present invention at a wide angle end.
Figure 4B:
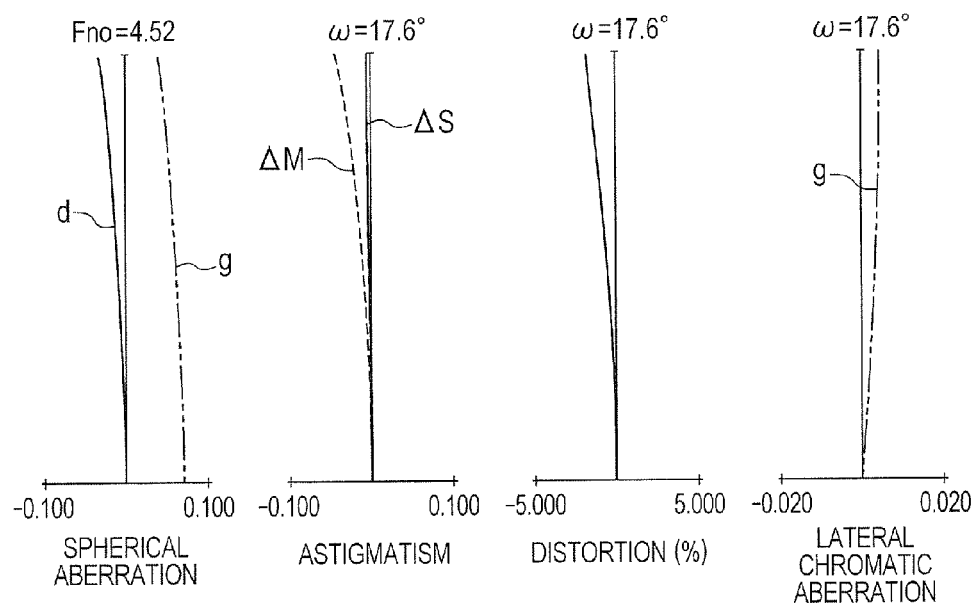
FIG. 4B is an aberration diagram of the zoom lens according to Embodiment 2 of the present invention at an intermediate zoom position.
Figure 4C:
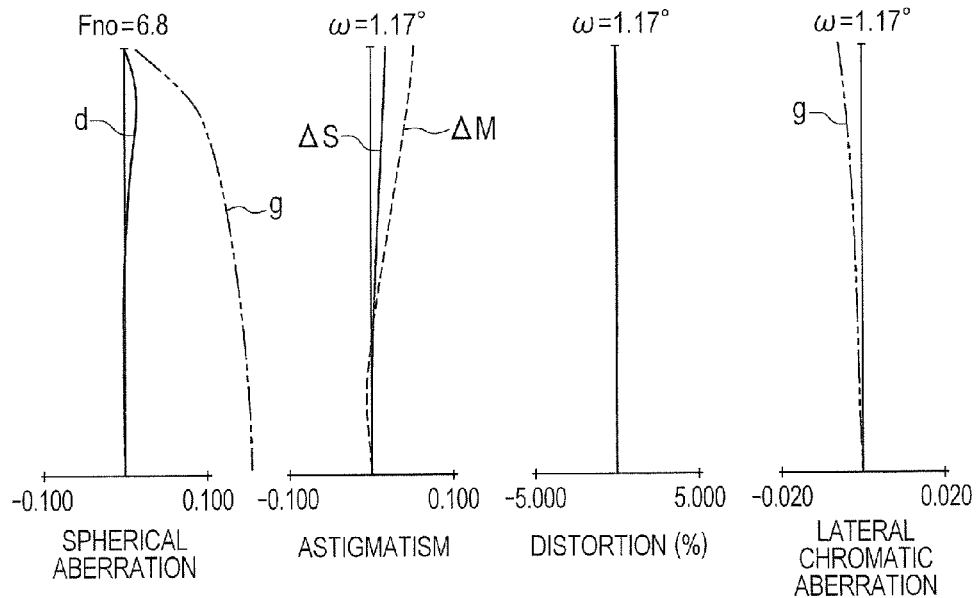
FIG. 4C is an aberration diagram of the zoom lens according to Embodiment 2 of the present invention at a telephoto end.

FIG. 1 is a lens cross-sectional view of a zoom lens according to Embodiment 1 of the present invention at a wide angle end (short focal length end). FIGS. 2A, 2B, and 2C are longitudinal aberration diagrams at the wide angle end, an intermediate zoom position, and a telephoto end (long focal length end), respectively, of the zoom lens of Embodiment 1. The zoom lens of Embodiment 1 has a zoom ratio of about 43 and an aperture ratio of from about 3.5 to 6.8. FIG. 3 is a lens cross-sectional view of a zoom lens according to Embodiment 2 of the present invention at a wide angle end. FIGS. 4A, 4B, and 4C are longitudinal aberration diagrams at the wide angle end, an intermediate zoom position, and a telephoto end, respectively, of the zoom lens of Embodiment 2. The zoom lens of Embodiment 2 has a zoom ratio of about 43 and an aperture ratio of from about 3.5 to 6.8.

Figure 6B:
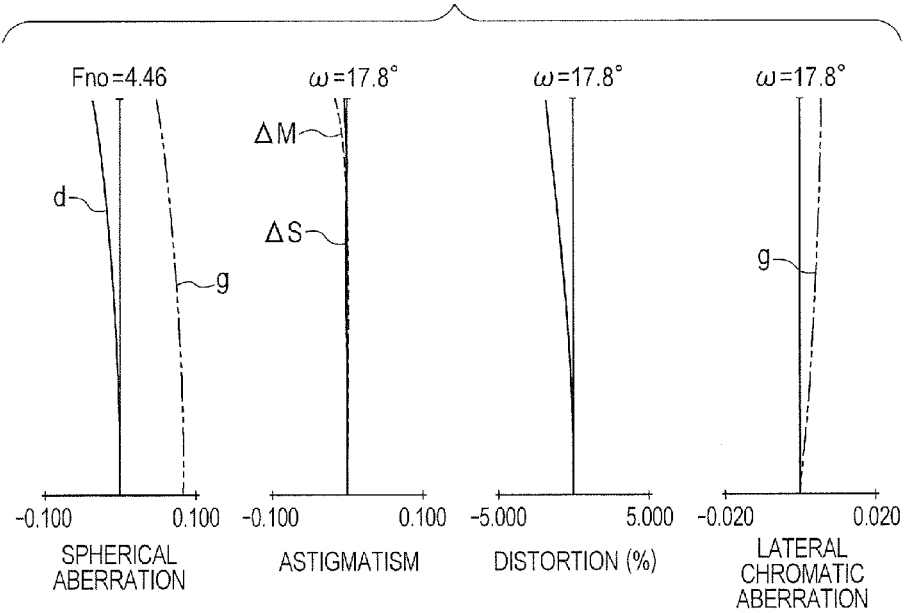
FIG. 6B is an aberration diagram of the zoom lens according to Embodiment 3 of the present invention at an intermediate zoom position.
Figure 6C:
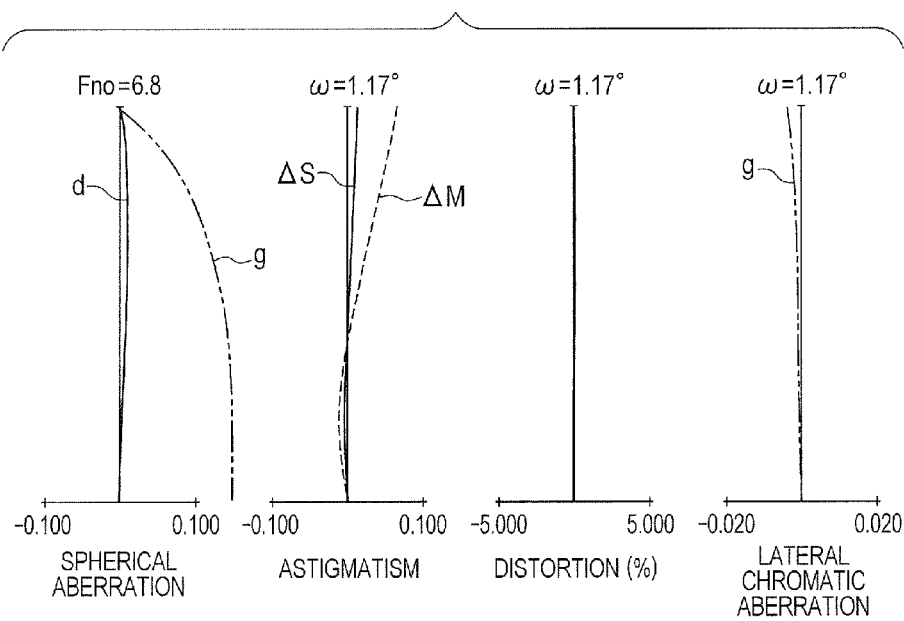
FIG. 6C is an aberration diagram of the zoom lens according to Embodiment 3 of the present invention at a telephoto end.
Figure 7:
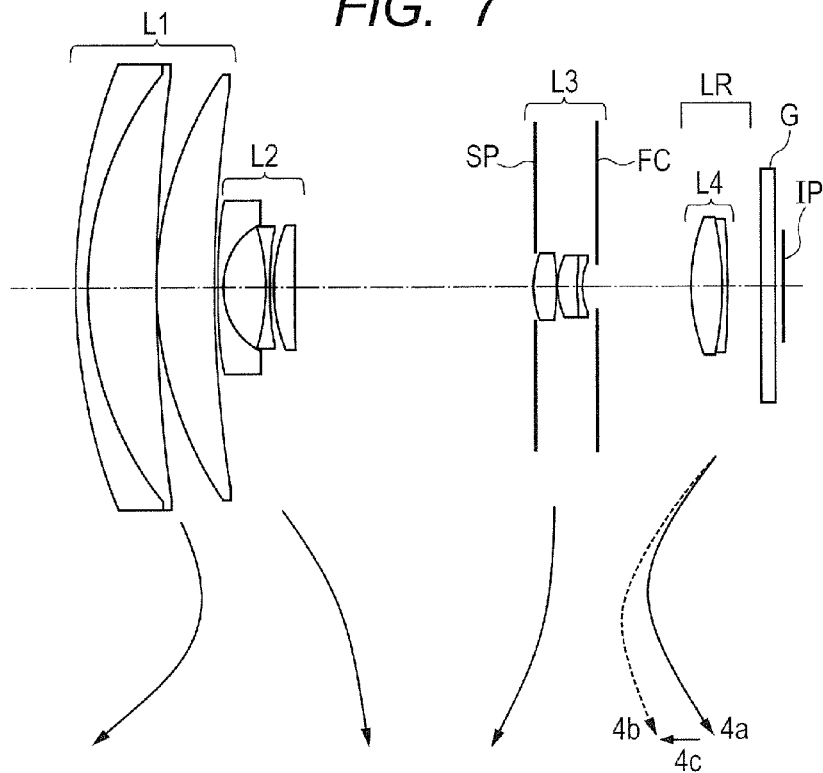
FIG. 7 is a lens cross-sectional view of a zoom lens according to Embodiment 4 of the present invention.
Figure 8A:
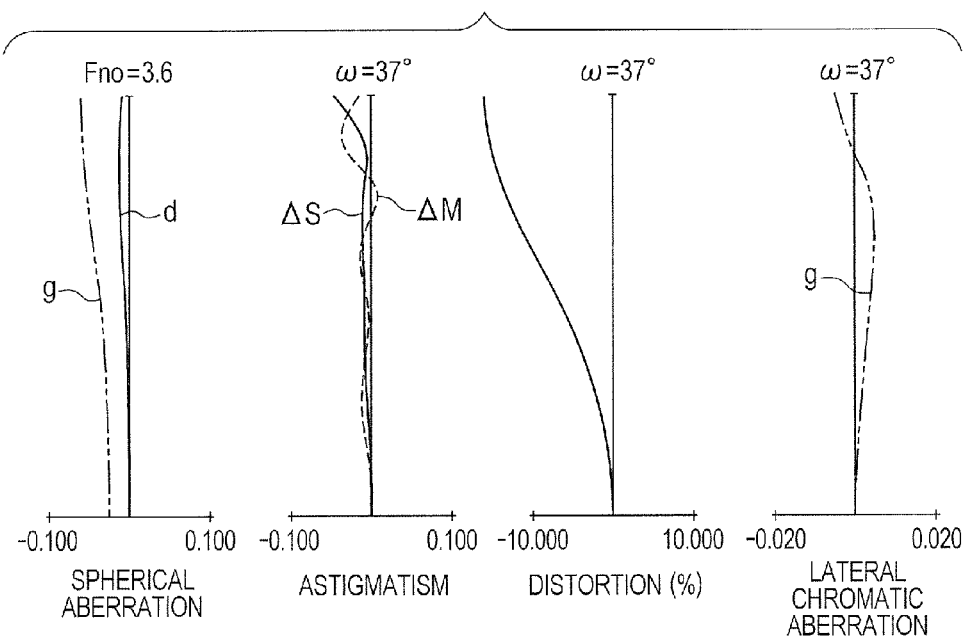
FIG. 8A is an aberration diagram of the zoom lens according to Embodiment 4 of the present invention at a wide angle end.
Figure 8B:
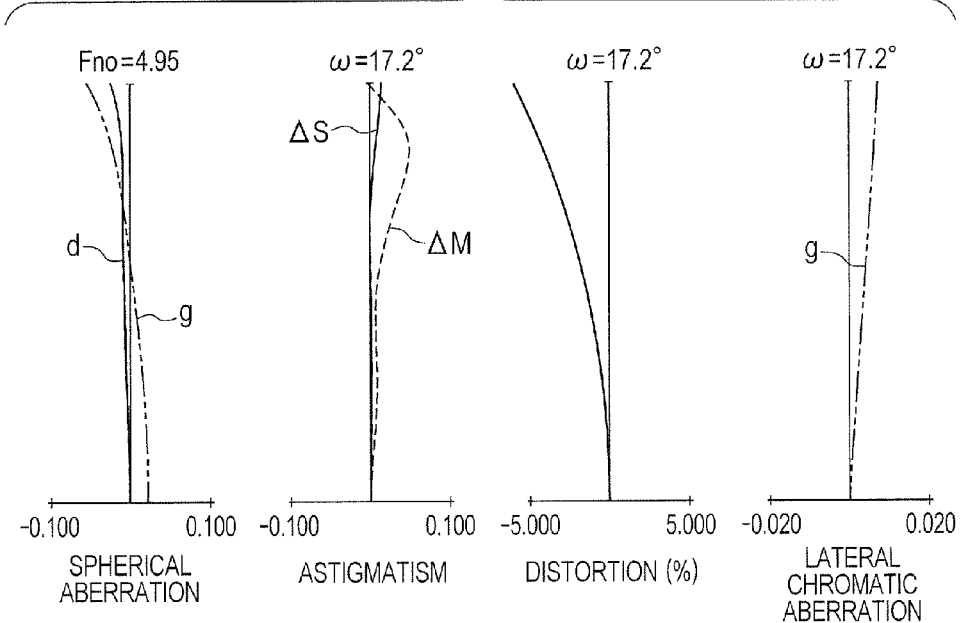
FIG. 8B is an aberration diagram of the zoom lens according to Embodiment 4 of the present invention at an intermediate zoom position.
Figure 8C:
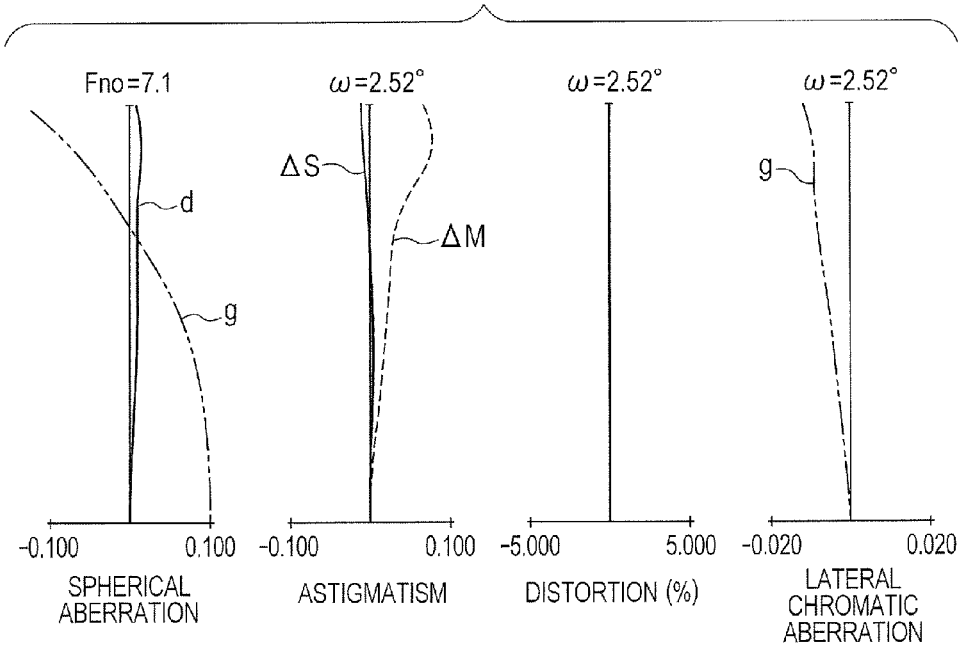
FIG. 8C is an aberration diagram of the zoom lens according to Embodiment 4 of the present invention at a telephoto end.

FIG. 5 is a lens cross-sectional view of a zoom lens according to Embodiment 3 of the present invention at a wide angle end. FIGS. 6A, 6B, and 6C are longitudinal aberration diagrams at the wide angle end, an intermediate zoom position, and a telephoto end, respectively, of the zoom lens of Embodiment 3. The zoom lens of Embodiment 3 has a zoom ratio of about 20 and an aperture ratio of from about 3.6 to 7.1. FIG. 7 is a lens cross-sectional view of a zoom lens according to Embodiment 4 of the present invention at a wide angle end. FIGS. 8A, 8B, and 8C are longitudinal aberration diagrams at the wide angle end, an intermediate zoom position, and a telephoto end, respectively, of the zoom lens of Embodiment 4. The zoom lens of Embodiment 4 has a zoom ratio of about 43 and an aperture ratio of from about 3.5 to 6.8.

Figure 9:
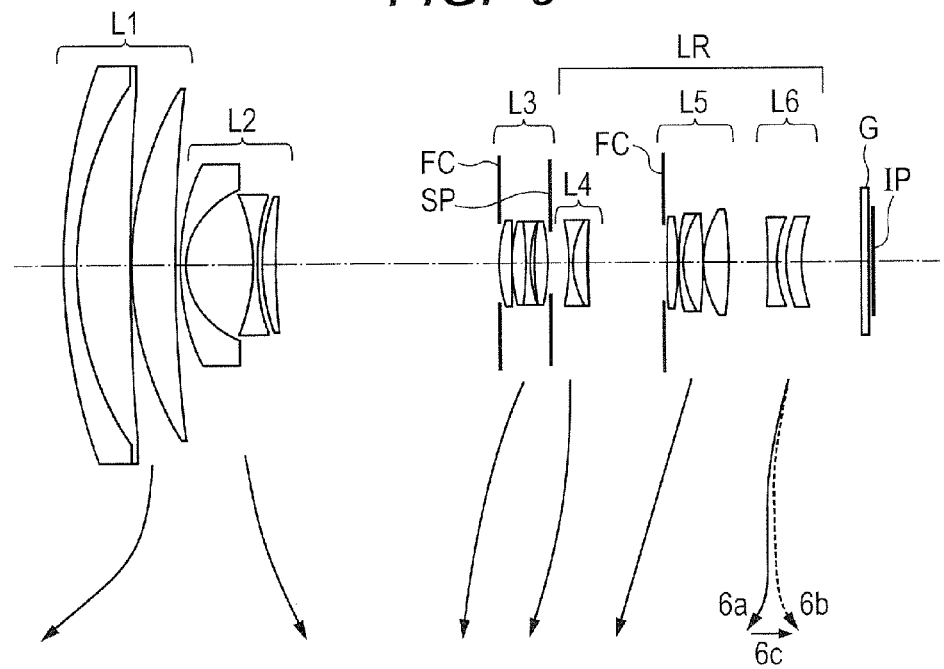
FIG. 9 is a lens cross-sectional view of a zoom lens according to Embodiment 5 of the present invention.
Figure 10A:
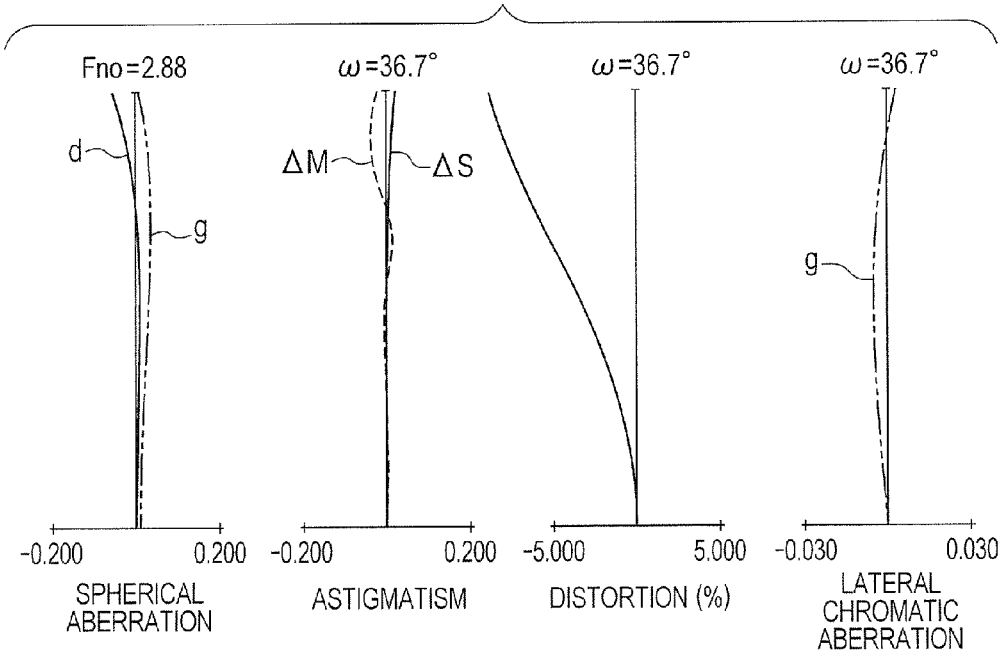
FIG. 10A is an aberration diagram of the zoom lens according to Embodiment 5 of the present invention at a wide angle end.
Figure 10B:
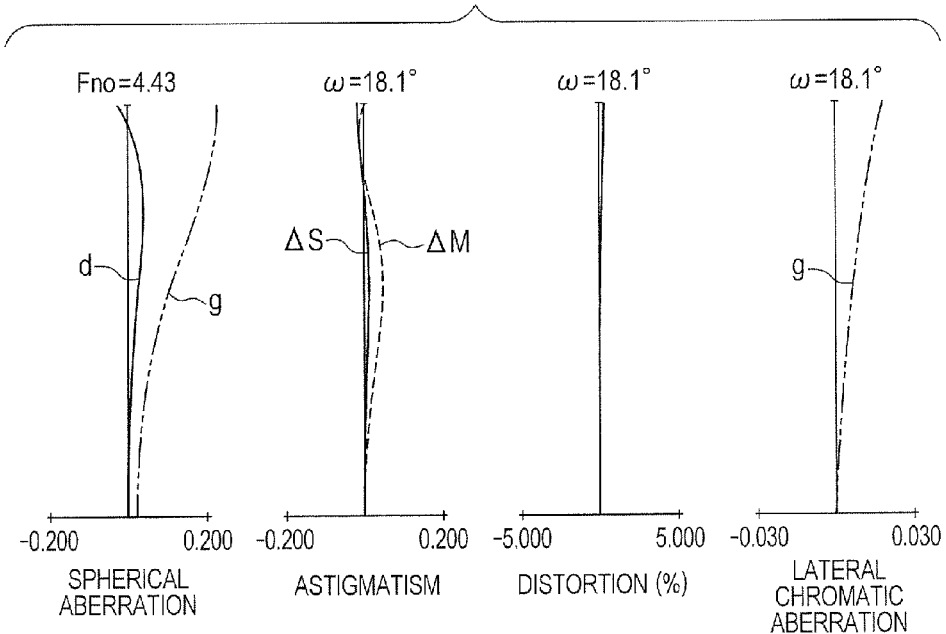
FIG. 10B is an aberration diagram of the zoom lens according to Embodiment 5 of the present invention at an intermediate zoom position.
Figure 10C:
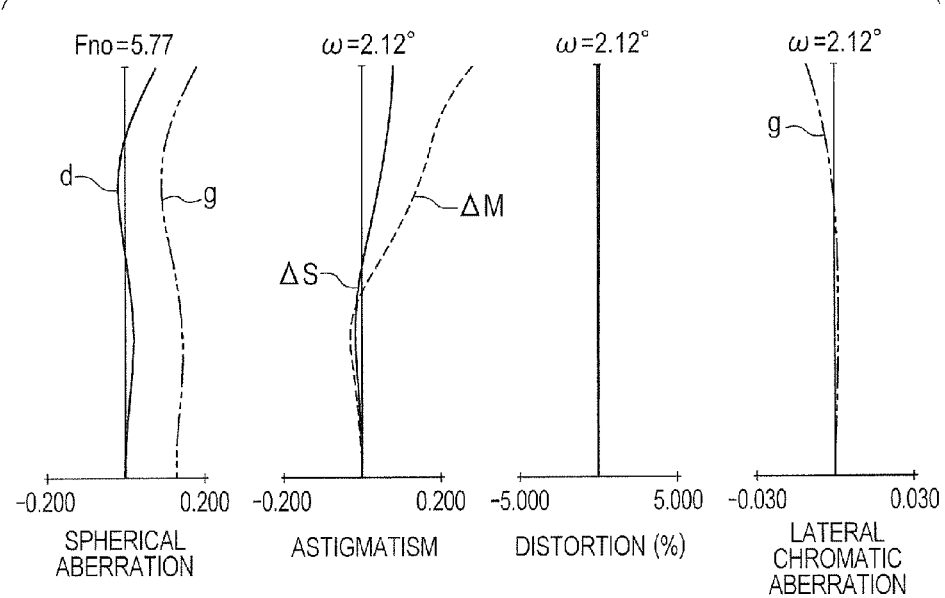
FIG. 10C is an aberration diagram of the zoom lens according to Embodiment 5 of the present invention at a telephoto end.

FIG. 9 is a lens cross-sectional view of a zoom lens according to Embodiment 5 of the present invention at a wide angle end. FIGS. 10A, 10B, and 10C are longitudinal aberration diagrams at the wide angle end, an intermediate zoom position, and a telephoto end, respectively, of the zoom lens of Embodiment 5. The zoom lens of Embodiment 5 has a zoom ratio of about 24 and an aperture ratio of from about 2.9 to 5.7.

In the lens cross-sectional view of each of Embodiments, a first lens unit L1 has a positive refractive power, a second lens unit L2 has a negative refractive power, and a third lens unit L3 has a positive refractive power. A rear lens group LR includes at least one lens unit. Moreover, a fourth lens unit L4 has a negative refractive power and a fifth lens unit L5 has a positive refractive power in Embodiments 1 to 3. Moreover, a fourth lens unit L4 has a positive refractive power in Embodiment 4. Moreover, a fourth lens unit L4 has a negative refractive power, a fifth lens unit L5 has a positive refractive power, and a sixth lens unit L6 has a negative refractive power in Embodiment 5.

Moreover, an aperture stop SP is illustrated in each of the lens cross-sectional views. In Embodiments 1, 2, and 3, the aperture stop SP is arranged on the object side of the third lens unit L3 and is configured to move independently of (along locus different from) other lens units during zooming. Moreover, in Embodiment 4, the aperture stop SP is arranged on the object side of the third lens unit L3 and is configured to move together with (along the same locus as) the third lens unit L3 during zooming. Moreover, in Embodiment 5, the aperture stop SP is arranged on the image side of the third lens unit L3 and is configured to move together with the third lens unit L3 during zooming.

A flare stop (flare cut stop) FP is illustrated in each of the lens cross-sectional views. Moreover, an optical block G corresponds to an optical filter, a face plate, a crystal low pass filter, an infrared cut filter, or the like. A photosensitive surface, which corresponds to a film plane of a silver-halide film camera, is arranged on an image plane IP of a solid-state image pickup element (photoelectric conversion element) such as a CCD sensor and a CMOS sensor when the zoom lens is used as an image pickup optical system of a video camera or a digital still camera. The arrows indicate movement loci of the respective lens units during zooming (magnification varying) from the wide angle end to the telephoto end, and a movement direction of a lens unit during focusing.

Among the aberration diagrams of each of Embodiments, in the spherical aberration diagram, a d-line and a g-line are represented by a solid line d and a two-dot chain line g, respectively. In the astigmatism diagram, a meridional image plane and a sagittal image plane are represented by ΔM (dotted line) and ΔS (solid line), respectively. Lateral chromatic aberration is represented by a g-line. A half angle of view (half value of image pickup angle) (degrees) is represented by ω and an f-number is represented by Fno. Note that, in each of Embodiments described below, the wide angle end and the telephoto end refer to zoom positions when a magnification-varying lens unit is positioned at one end and the other end of a range in which the magnification-varying lens unit is mechanically movable on an optical axis, respectively.

The zoom lens of Embodiments 1 to 3 consists of, in order from the object side to the image side, the first lens unit L1 having the positive refractive power, the second lens unit L2 having the negative refractive power, the third lens unit L3 having the positive refractive power, the fourth lens unit L4 having the negative refractive power, and the fifth lens unit L5 having the positive refractive power. A lens unit arranged closest to the image side is the fifth lens unit L5.

The zoom lens of Embodiments 1 to 3 performs main varying magnification with the movement of the first lens unit L1, the second lens unit L2, and the third lens unit L3. Each of the lens units is configured to move as follows in zooming from the wide angle end to the telephoto end. The first lens unit L1 is configured to move along a locus that is convex toward the image side, to thereby reduce an effective diameter of a front lens at the wide angle end and realize a higher zoom ratio. Moreover, the first lens unit L1 has the locus that is convex toward the image side and an interval between the first lens unit L1 and the aperture stop SP is thus narrowed, to thereby reduce the first lens unit L1 in size.

The second lens unit L2 is configured to move toward the image side, to thereby provide large varying magnification power. Moreover, the third lens unit L3 is configured to move toward the object side, to thereby provide varying magnification power. Moreover, the aperture stop SP is configured to move independently of (along locus different from) other lens units during zooming so that the aperture stop SP comes close to the first lens unit L1 side at the wide angle end, to thereby reduce the first lens unit L1 and the second lens unit L2 in size. The fifth lens unit L5 has a role of correcting the shift of the image plane position accompanying varying magnification, and is configured to move on the optical axis for focusing.

In the lens cross-sectional views, the solid curve 5a and the dotted curve 5b regarding the fifth lens unit L5 are movement loci for correcting an image plane variation accompanying the magnification varying when focused at an object at infinity and an object at proximity, respectively. Moreover, in a case where focusing is performed from the object at infinity to the object at proximity at the telephoto end, the focusing is performed by moving the fifth lens unit L5 forward (toward the object side) as indicated by the arrow 5c. Over the entire zoom range, the fifth lens unit L5 is configured to move toward the object side when focusing is performed from the object at infinity to the object at the short distance.

The zoom lens of Embodiment 4 consists of, in order from the object side to the image side, the first lens unit L1 having a positive refractive power, the second lens unit L2 having a negative refractive power, the third lens unit L3 having a positive refractive power, and the fourth lens unit L4 having a positive refractive power. A lens unit arranged closest to the image side is the fourth lens unit L4. The zoom lens of Embodiment 4 performs main varying magnification with the movement of the first lens unit L1, the second lens unit L2, and the third lens unit L3.

Each of the lens units is configured to move as follows in zooming from the wide angle end to the telephoto end. The first lens unit L1 is configured to move along a locus that is convex toward the image side, to thereby reduce an effective diameter of a front lens at the wide angle end and realize a higher zoom ratio. Moreover, the first lens unit L1 has the locus that is convex toward the image side and an interval between the first lens unit L1 and the aperture stop SP is thus narrowed, to thereby reduce the first lens unit L1 in size. The second lens unit L2 is configured to move toward the image side, to thereby provide large varying magnification power. Moreover, the third lens unit L3 is configured to move toward the object side, to thereby provide varying magnification power.

The fourth lens unit L4 has a role of correcting the shift of the image plane position accompanying zooming, and is configured to move on the optical axis for focusing. The solid curve 4a and the dotted curve 4b regarding the fourth lens unit L4 are movement loci for correcting an image plane variation accompanying varying magnification when focused at an object at infinity and an object at proximity, respectively. Moreover, in a case where focusing is performed from the object at infinity to the object at proximity at the telephoto end, the focusing is performed by moving the fourth lens unit L4 forward as indicated by the arrow 4c. Over the entire zoom range, the fourth lens unit L4 is configured to move toward the object side when focusing is performed from the object at infinity to the object at the short distance.

The zoom lens of Embodiment 5 consists of, in order from the object side to the image side, the first lens unit having a positive refractive power, the second lens unit having a negative refractive power, the third lens unit having a positive refractive power, the fourth lens unit having a negative refractive power, the fifth lens unit having a positive refractive power, and the sixth lens unit having a negative refractive power. A lens unit arranged closest to the image side is the sixth lens unit L6. The zoom lens of Embodiment 5 performs main varying magnification with the movement of the first lens unit L1, the second lens unit L2, and the fifth lens unit L5. Each of the lens units is configured to move as follows in zooming from the wide angle end to the telephoto end.

The first lens unit L1 is configured to move toward the object side, to thereby reduce an effective diameter of a front lens at the wide angle end and realize a higher zoom ratio. The second lens unit L2 is configured to move toward the image side, to thereby provide large varying magnification power. Moreover, the fifth lens unit L5 is configured to move toward the object side, to thereby provide varying magnification power. The sixth lens unit L6 has a role of correcting the shift of the image plane position accompanying zooming, and is configured to move on the optical axis for focusing.

A solid curve 6a and a dotted curve 6b regarding the sixth lens unit L6 are movement loci for correcting image plane variation accompanying zooming from the wide angle end to the zoom position at the telephoto end when focusing at the object at infinity and the object at the short distance, respectively. Moreover, in a case where focusing is performed from the object at infinity to the object at the short distance at the zoom position at the telephoto end, the focusing is performed by retracting the sixth lens unit L6 backward (toward the image side) as indicated by the arrow 6c. Over the entire zoom range, the sixth lens unit L6 is configured to move toward the image side when focusing is performed from the object at infinity to the object at the short distance.

Characteristic points for obtaining the effect of the present invention that are common throughout Embodiments are described. In each of Embodiments, the lens unit arranged closest to the image side includes at least two lenses. Relative partial dispersion and an Abbe number of a material of each of lenses forming the lens unit arranged closest to the image side are represented by θgFr and vdr, respectively, a focal length of the first lens unit L1 is represented by f1, and a focal length of the zoom lens at the wide angle end is represented by fw. Then, the following conditional expressions are satisfied:

$$0.0 < \theta gFr - (-1.520 \times 10^{-7} \times vdr^3 + 5.213 \times 10^{-5} \times vdr^2 - 5.500 \times 10^{-3} \times vdr + 0.730) \quad (1); \text{ and}$$

$$12.0 < f1/fw < 40.0 \quad (2).$$

In this case, the Abbe number νd and the relative partial dispersion θgF of the material are defined as follows, $$\nu d=(Nd-1)/(NF-NC)$$

$$\theta gF=(Ng-NF)/(NF-NC)$$

where Ng, NF, NC, and Nd respectively represent refractive indices of the material with respect to a g-line (wavelength: 435.8 nm), an F-line (486.1 nm), a C-line (656.3 nm), and a d-line (587.6 nm).

Next, the technical meaning of each of the above-mentioned conditional expressions is described. Conditional Expressions (1) and (2) are satisfied for, while enhancing zoom magnification (zoom ratio), satisfactorily correcting axial chromatic aberration at the telephoto end and lateral chromatic aberration at the wide angle end. Conditional Expression (1) defines a material for satisfactorily correcting the secondary spectrum of the axial chromatic aberration at the telephoto end and the secondary spectrum of the lateral chromatic aberration at the wide angle end.

In order to correct the secondary spectrum of the axial chromatic aberration at the telephoto end, it is effective to select materials having high relative partial dispersion θgFr as materials of positive lenses included in the first lens unit L1 and the third lens unit L3. In this case, however, the secondary spectrum of the lateral chromatic aberration is simultaneously increased at the wide angle end.

When a material having an anomalous dispersion characteristic is used for a positive lens included in the lens unit arranged closest to the image side based on Conditional Expression (1), the secondary spectrum of the lateral chromatic aberration is easily corrected at the wide angle end. Moreover, when a material having an anomalous dispersion characteristic is used for a negative lens included in the lens unit arranged closest to the image side based on Conditional Expression (1), the secondary spectrum of the axial chromatic aberration is more easily corrected. When the value falls below the lower limit value of Conditional Expression (1), the secondary spectrum of the axial chromatic aberration is increased at the telephoto end and the secondary spectrum of the lateral chromatic aberration is increased at the wide angle end, which is not preferred.

Conditional Expression (2) defines the focal length fw of the zoom lens and the focal length f1 of the first lens unit L1 at the wide angle end. When the focal length of the first lens unit L1 is increased to exceed the upper limit value of Conditional Expression (2), there are advantages in correcting the lateral chromatic aberration at the wide angle end and correcting the axial chromatic aberration at the telephoto end, but a movement amount of the first lens unit L1 during zooming is increased. As a result, the zoom lens is increased in size, which is not preferred. Moreover, when the focal length of the first lens unit L1 is reduced to fall below the lower limit value of Conditional Expression (2), there is an advantage in reducing the zoom lens in size, but it becomes difficult to satisfactorily correct spherical aberration and coma with a small number of lenses, which is not preferred.

Moreover, the focal length of the zoom lens is increased on the wide angle side, and it becomes difficult to ensure a desired zoom magnification, which is not preferred. Note that, in each of Embodiments, it is preferred to satisfy the following numerical range of Conditional Expression (2).

$$12.5<f1/fw<30.0 \qquad (2a)$$

It is more preferred to satisfy the following numerical range of Conditional Expression (2a).

$$12.9<f1/fw<20.0 \qquad (2b)$$

In each of Embodiments, the above-mentioned configuration is adopted, to thereby obtain a small zoom lens having a wide angle of view, a high zoom ratio, and high optical performance. In each of Embodiments, it is further preferred to satisfy at least one of the following conditional expressions. A focal length of the zoom lens at the telephoto end is represented by ft, the focal length of the second lens unit L2 is represented by f2, the focal length of the third lens unit L3 is represented by f3, and an Abbe number of the material of the positive lens included in the lens unit arranged closest to the image side is represented by νdrp. An Abbe number of the material of the negative lens included in the lens unit arranged closest to the image side is represented by νdrn.

A movement amount of the first lens unit during zooming from the wide angle end to the telephoto end is represented by m1. A movement amount of the third lens unit L3 during zooming from the wide angle end to the telephoto end is represented by m3. A focal length of the lens unit arranged closest to the image side is represented by fr. A refractive index of the material of the negative lens included in the lens unit arranged closest to the image side is represented by Ndrn. It is preferred to satisfy at least one of the following conditional expressions.

$$1.5<ft/f1<5.0 \qquad (3)$$

$$-30.0<ft/f2<-5.0 \qquad (4)$$

$$5.0<ft/f3<20.0 \qquad (5)$$

$$10.0<\nu dr<100.0 \qquad (6)$$

$$40.0<\nu drp<100.0 \qquad (7)$$

$$10.0<\nu drn<40.0 \qquad (8)$$

$$-30.0<m1/fw<-3.0 \qquad (9)$$

$$-10.0<m3/fw<-0.5 \qquad (10)$$

$$2.0<|ft/fr|<15.0 \qquad (11)$$

$$1.6<Ndrn<2.3 \qquad (12)$$

Next, technical meanings of the above-mentioned conditional expressions are described. Conditional Expression (3) defines the focal length of the first lens unit L1 with respect to the focal length of the zoom lens at the telephoto end. When the focal length of the first lens unit L1 becomes too short and exceeds the upper limit value of Conditional Expression (3), it becomes difficult to correct the spherical aberration and the coma. Alternatively, the focal length of the zoom lens becomes too long at the telephoto end, and it becomes difficult to correct the axial chromatic aberration, the spherical aberration, the coma, and the like.

When the focal length of the first lens unit L1 becomes too long and falls below the lower limit value of Conditional Expression (3), in order to realize higher zoom ratio, the movement amount of the first lens unit L1 during zooming is required to be large, resulting in an increase in total lens length, which is not preferred. Alternatively, the focal length of the zoom lens is reduced at the telephoto end, and it becomes difficult to realize higher zoom ratio, which is not preferred.

Conditional Expression (4) defines the focal length of the second lens unit L2 with respect to the focal length of the zoom lens at the telephoto end. When the negative focal length of the second lens unit L2 is reduced (absolute value of negative focal length is reduced) to fall below the lower limit value of Conditional Expression (4), a variation in curvature of field during zooming is increased, which is not preferred. When the negative focal length of the second lens unit L2 is increased (absolute value of negative focal length is increased) to exceed the upper limit value of Conditional Expression (4), in order to obtain a desired zoom ratio, the movement amount of the first lens unit L1 during zooming is required to be large. Thus, the total lens length is increased, which is not preferred.

Conditional Expression (5) defines the focal length of the third lens unit L3 with respect to the focal length of the zoom lens at the telephoto end. When the focal length of the third lens unit L3 is reduced to exceed the upper limit value of Conditional Expression (5), the curvature of field and the spherical aberration are increased, which is not preferred. When the focal length of the third lens unit L3 is increased to fall below the lower limit value of Conditional Expression (5), in order to obtain a desired zoom ratio, the movement amount of the third lens unit L3 during zooming is required to be large, and the total lens length is increased, which is not preferred.

Conditional Expression (6) defines the Abbe number of the material of each of the lenses forming the lens unit arranged closest to the image side. When the Abbe number is reduced to fall below the lower limit value of Conditional Expression (6), there is an advantage in correcting the secondary spectrum of the lateral chromatic aberration at the wide angle end, but correction of the axial chromatic aberration is insufficient at the telephoto end, which is not preferred. When the Abbe number is increased to exceed the upper limit value of Conditional Expression (6), the secondary spectrum of the lateral chromatic aberration is increased at the wide angle end, which is not preferred.

Conditional Expression (7) defines the material of the positive lens included in the lens unit arranged closest to the image side, which is required for satisfactorily correcting the chromatic aberration at the telephoto end while enhancing the zoom ratio. When the Abbe number of the material of the positive lens is reduced to fall below the lower limit value of Conditional Expression (7), in order to correct the chromatic aberration, a difference in Abbe number between the material of the positive lens and the material of the negative lens included in the lens unit arranged closest to the image side is required to be small. As a result, the curvature of the lens surface is reduced and the lens thickness is thus increased for ensuring the edge thickness of the lens, resulting in an increase in zoom lens in size, which is not preferred. When the Abbe number of the material of the positive lens is increased to exceed the upper limit value of Conditional Expression (7), correction of the lateral chromatic aberration is insufficient at the telephoto end, which is not preferred.

Conditional Expression (8) defines the material of the negative lens included in the lens unit arranged closest to the image side, which is required for satisfactorily correcting the chromatic aberration at the wide angle end and the telephoto end while enhancing the zoom ratio. When the Abbe number of the material of the negative lens is reduced to fall below the lower limit value of Conditional Expression (8), correction of the axial chromatic aberration is insufficient at the telephoto end, and the lateral chromatic aberration is overcorrected at the wide angle end, which is not preferred. When the Abbe number of the material of the negative lens is increased to exceed the upper limit value of Conditional Expression (8), a difference in Abbe number between the material of the negative lens and the material of the positive lens included in the lens unit arranged closest to the image side is required to be small.

As a result, the curvature of the lens surface is reduced and the lens thickness is thus increased for ensuring the edge thickness of the lens, resulting in an increase in zoom lens in size, which is not preferred.

Conditional Expression (9) defines the focal length of the zoom lens at the wide angle end and the movement amount of the first lens unit L1 during zooming. The phrase "movement amount of lens unit during zooming" as used herein is defined by a difference amount between a position on the optical axis at the wide angle end and a position on the optical axis at the telephoto end. The sign of the movement amount is negative when the lens unit is located on the object side at the telephoto end with respect to the wide angle end, and is positive when the lens unit is located on the image side at the telephoto end with respect to the wide angle end.

When the focal length of the zoom lens at the wide angle end is increased to exceed the upper limit value of Conditional Expression (9), it becomes difficult to obtain a high zoom ratio, which is not preferred. Alternatively, the movement amount of the first lens unit L1 during zooming is reduced and the refractive power of the first lens unit L1 becomes too strong, resulting in increases in spherical aberration and coma, which is not preferred.

When the focal length of the zoom lens at the wide angle end is reduced to fall below the lower limit value of Conditional Expression (9), the lens diameter of the first lens unit L1 is increased to increase the zoom lens in size, which is not preferred. Alternatively, when the movement amount of the first lens unit L1 during zooming is increased, the total lens length at the telephoto end is increased to increase the zoom lens in size, which is not preferred.

Conditional Expression (10) defines the focal length of the zoom lens at the wide angle end and the movement amount of the third lens unit L3 during zooming. When the focal length of the zoom lens at the wide angle end is increased to exceed the upper limit value of Conditional Expression (10), it becomes difficult to obtain a high zoom ratio, which is not preferred. Alternatively, the movement amount of the third lens unit L3 during zooming is reduced, and in order to obtain a high zoom ratio, the positive refractive power of the third lens unit L3 is required to be strong, resulting in increases in spherical aberration and coma, and axial chromatic aberration at the telephoto end, which is not preferred.

When the focal length of the zoom lens at the wide angle end is reduced to fall below the lower limit value of Conditional Expression (10), the lens diameter of the first lens unit L1 is increased to increase the zoom lens in size, which is not preferred. Alternatively, when the movement amount of the third lens unit L3 during zooming is increased, the total lens length at the telephoto end is increased to increase the zoom lens in size, which is not preferred.

Conditional Expression (11) defines the focal length of the lens unit arranged closest to the image side with respect to the focal length of the zoom lens at the telephoto end. When the focal length of the lens unit arranged closest to the image side is reduced to exceed the upper limit value of Conditional Expression (11), a refractive power of each of the lenses forming the lens unit arranged closest to the image side is increased and the lens thickness is thus increased for ensuring the edge thickness of the lens, resulting in an increase in zoom lens in size, which is not preferred.

Alternatively, the focal length of the zoom lens at the telephoto end is increased, and it becomes difficult to satisfactorily correct the axial chromatic aberration at the telephoto end. When the focal length of the lens unit arranged closest to the image side is increased to fall below the lower limit value of Conditional Expression (11), it becomes difficult to correct the axial chromatic aberration at the telephoto end, which is not preferred. Alternatively, the focal length of the zoom lens at the telephoto end is reduced, and it becomes difficult to obtain a high zoom ratio, which is not preferred.

Conditional Expression (12) defines the refractive index of the material of the negative lens included in the lens unit arranged closest to the image side. When the refractive index of the material of the negative lens is increased to exceed the upper limit value of Conditional Expression (12), the relative partial dispersion θgFr becomes too large, and the secondary spectrum of the lateral chromatic aberration tends to be overcorrected at the wide angle end, which is not preferred.

When the refractive index of the material of the negative lens is reduced to fall below the lower limit value of Conditional Expression (12), the relative partial dispersion θgFr becomes too small, and correction of the secondary spectrum of the lateral chromatic aberration tends to be insufficient at the wide angle end, which is not preferred. Moreover, when the refractive index of the material of the negative lens is reduced, it is necessary to select a material having a larger Abbe number as the material of the negative lens. Then, it becomes difficult to correct the axial chromatic aberration at the telephoto end, which is not preferred. Note that, in each of Embodiments, it is preferred to set the numerical ranges of Conditional Expression (3) to Conditional Expression (12) as follows.

$$1.52 < ft/f1 < 5.00 \quad (3a)$$

$$-30.0 < ft/f2 < -10.0 \quad (4a)$$

$$7.0 < ft/f3 < 20.0 \quad (5a)$$

$$10.0 < vdr < 85.0 \quad (6a)$$

$$45.0 < vdrp < 85.0 \quad (7a)$$

$$10.0 < vdrn < 30.0 \quad (8a)$$

$$-25.0 < m1/fw < -5.0 \quad (9a)$$

$$-10.0 < m3/fw < -0.9 \quad (10a)$$

$$4.0 \leq ft/|fr| < 15.0 \quad (11a)$$

$$1.61 < Ndrn < 2.20 \quad (12a)$$

Moreover, in each of Embodiments, it is further preferred to set the numerical ranges of Conditional Expression (3a) to Conditional Expression (12a) as follows. With this, the effect represented by each of the conditional expressions described above can be maximally obtained.

$$1.54 < ft/f1 < 3.00 \quad (3b)$$

$$-25.0 < ft/f2 < -12.0 \quad (4b)$$

$$8.0 \leq ft/f3 < 15.0 \quad (5b)$$

$$15.0 < vdr < 60.0 \quad (6b)$$

$$50.0 < vdrp < 60.0 \quad (7b)$$

$$15.0 < vdrn < 25.0 \quad (8b)$$

$$-15.0 < m1/fw < -7.0 \quad (9b)$$

$$-6.0 < m3/fw < -0.9 \quad (10b)$$

$$4.2 \leq ft/|fr| < 10.0 \quad (11b)$$

$$1.62 < Ndrn < 2.20 \quad (12b)$$

In the zoom lens of each of Embodiments, an off-axial light beam passes through the lens unit arranged closest to the image side at a position away from the optical axis. Thus, an increase in number of the lenses leads to an increase in effective diameter and an increase in thickness of the lens unit. For this reason, it is preferred that the lens unit arranged closest to the image side include two lenses. Moreover, it is preferred that the lens unit arranged closest to the image side include one negative lens and one positive lens that are arranged with an air gap in order to satisfactorily correct the chromatic aberration. Moreover, it is preferred that the lens unit arranged closest to the image side include lenses independent of each other. A lens formed of an anomalous dispersion material is provided with an aspherical surface so that, without using any cemented lens, the spherical aberration, the coma, and the chromatic aberration are easily corrected in different ways.

Moreover, in order to realize a wider angle of view and a higher zoom ratio while reducing the zoom lens in size, it is preferred that the first lens unit L1 include a smaller number of lenses. With this, the off-axial light can be caused to pass through the first lens unit L1 at a low position, thereby being capable of reducing an effective diameter of the first lens unit L1. For this reason, it is preferred that the first lens unit L1 include three or less lenses. It is further preferred that the first lens unit L1 include, in order from the object side to the image side, three lenses of a negative lens, a positive lens, and a positive lens.

Moreover, in order to realize a wider angle of view, it is preferred that the second lens unit L2 include, in order from the object side to the image side, two negative lenses and a positive lens as a final lens. A lens having a positive refractive power is used as the final lens to converge a light beam, thereby being capable of reducing effective diameters of the lens units arranged on the image side of the second lens unit L2. Moreover, as the second lens unit L2, a lens unit having a negative refractive power in which a negative lens unit is arranged ahead of a positive lens is used, to thereby easily realize a wider angle of view during zooming. Moreover, it is preferred that the third lens unit L3 include, in order from the object side to the image side, a positive lens, a negative lens, and a positive lens.

With the third lens unit L3 having a triplet configuration as described above, the spherical aberration and the coma are easily satisfactorily corrected over the entire zoom range. Moreover, it is preferred that aspherical surfaces are provided to the lenses in the first lens unit L1, the lenses in the third lens unit L3, and the lenses arranged from the third lens unit L3 to the image side, or the lenses in the third lens unit L3 depending on the specification. The lenses arranged in and behind the third lens unit L3 and the refractive power of the second lens unit L2 are appropriately set, to thereby easily correct off-axial various aberrations, especially the astigmatism and the distortion, and the spherical aberration and the coma appeared when a wider angle of view and a higher zoom ratio are realized.

In each of Embodiments, the respective elements are configured as described above, to thereby obtain a small zoom lens having a wide angle of view, a high zoom ratio, and high optical performance.

In the following, Numerical Embodiments 1 to 5 corresponding to Embodiments 1 to 5, respectively, are described. In each of Numerical Embodiments, symbol i represents the order of a surface from the object side, symbol ri represents a curvature radius of a lens surface, symbol di represents a lens thickness and an air gap between an i-th surface and an (i+1)th surface, and symbols ndi, νdi and θgFi represent a refractive index, an Abbe number and a relative partial dispersion of a material of an optical member between the i-th surface and the (i+1)th surface with respect to the d-line, respectively. Moreover, symbols k, A4, A6, A8, A10, A12, and A14 represent aspherical coefficients.

An aspherical shape is expressed by the following expression:

$$x=(h^2/R)/[1+\{1(1+k)(h/R)^2\}^{1/2}]+A4h^4+A6h^6+A8h^8+A10h^{10}+A12h^{12}+A14h^{14},$$

where x represents a displacement in the optical axis direction at a position having a height h from the optical axis with reference to the vertex of a surface, and R represents a paraxial curvature radius. In each of Embodiments (Numerical Embodiments), a surface closest to the image side and a surface next to that surface are surfaces of an optical block such as a filter or a face plate.

In each of Embodiments, back focus (BF) corresponds to a distance from a lens final surface to a paraxial image plane, the distance being represented by an air-equivalent length. A total lens length is obtained by adding the back focus to a distance from a surface closest to the object side to the final lens surface. Moreover, correspondence between each of Embodiments (Numerical Embodiments) and the conditional expressions described above is shown in Table 1. In Table 1, refer to Conditional Expressions (7) and (8) about Conditional Expression (6).

Numerical Embodiment 1

Unit mm

Surface Data

| Surface number i | ri | di | ndi | νdi | θgFi |
|---|---|---|---|---|---|
| 1 | 102.913 | 1.20 | 1.83400 | 37.2 | |
| 2 | 44.387 | 4.55 | 1.49700 | 81.5 | |
| 3 | −154.419 | 0.05 | | | |
| 4 | 36.675 | 3.05 | 1.48749 | 70.2 | |
| 5 | 114.342 | (Variable) | | | |
| 6 | 507.557 | 0.60 | 1.83481 | 42.7 | |
| 7 | 7.749 | 4.40 | | | |
| 8 | −20.281 | 0.50 | 1.80400 | 46.6 | |
| 9 | 45.045 | 0.05 | | | |
| 10 | 19.048 | 1.93 | 1.94595 | 18.0 | |
| 11 | 1,453.932 | (Variable) | | | |
| 12 (Stop) | ∞ | (Variable) | | | |
| 13* | 8.625 | 2.75 | 1.49710 | 81.6 | |
| 14* | −37.447 | 2.59 | | | |
| 15 | 26.629 | 0.40 | 1.80610 | 33.3 | |
| 16 | 8.840 | 0.89 | | | |
| 17* | 16.420 | 1.95 | 1.49710 | 81.6 | |
| 18* | −20.553 | 1.60 | | | |
| 19 | ∞ | (Variable) | (Flare cut stop) | | |
| 20 | −31.135 | 0.70 | 1.53160 | 55.8 | |
| 21* | 27.006 | (Variable) | | | |
| 22 | 16.864 | 2.90 | 1.53160 | 55.8 | 0.5672 |
| 23 | −20.985 | 0.30 | | | |
| 24 | −25.415 | 0.70 | 1.80809 | 22.8 | 0.6307 |
| 25 | −46.565 | (Variable) | | | |
| 26 | ∞ | 1.00 | 1.51633 | 64.1 | |
| 27 | ∞ | 0.54 | | | |
| Image plane | ∞ | | | | |

Unit mm

Aspherical surface data

Thirteenth surface

K = −2.78153e−001    A4 = −8.03728e−005    A6 = −2.76810e−006
A8 = −3.05048e−008

Fourteenth surface

K = 0.00000e+000    A4 = 1.08506e−004    A6 = −4.47173e−006

Seventeenth surface

K = 0.00000e+000    A4 = −1.61675e−005    A6 = −2.74725e−006

Eighteenth surface

K = 0.00000e+000    A4 = −1.96008e−005    A6 = −8.92431e−007

Twentieth surface

K = −1.82035e+000    A4 = 2.28910e−005

Twenty-first surface

K = 4.88465e+000    A4 = 3.04587e−005

Various data
Zoom ratio 43.24

| | Wide angle | Intermediate | Telephoto |
|---|---|---|---|
| Focal length | 4.38 | 12.20 | 189.50 |
| F-number | 3.51 | 4.57 | 6.78 |
| Half angle of view (degree) | 35.94 | 17.63 | 1.17 |
| Total lens length | 83.55 | 85.32 | 128.46 |
| BF | 7.64 | 14.51 | 5.81 |
| d5 | 0.80 | 15.56 | 59.69 |
| d11 | 30.36 | 9.95 | 1.40 |
| d12 | 7.85 | 6.10 | 0.50 |
| d19 | 2.83 | 4.25 | 11.12 |
| d21 | 2.95 | 3.85 | 18.84 |
| d25 | 6.45 | 13.31 | 4.61 |

Zoom lens unit data

| Unit | First surface | Focal length |
|---|---|---|
| 1 | 1 | 77.76 |
| 2 | 6 | −8.57 |
| 3 | 13 | 15.93 |
| 4 | 20 | −27.09 |
| 5 | 22 | 23.91 |

Numerical Embodiment 2

Unit mm

Surface Data

| Surface number i | ri | di | ndi | νdi | θgFi |
|---|---|---|---|---|---|
| 1 | 102.910 | 1.20 | 1.83400 | 37.2 | |
| 2 | 44.379 | 4.52 | 1.49700 | 81.5 | |
| 3 | −154.372 | 0.05 | | | |
| 4 | 36.679 | 3.05 | 1.48749 | 70.2 | |
| 5 | 114.342 | (Variable) | | | |
| 6 | 511.353 | 0.60 | 1.83481 | 42.7 | |
| 7 | 7.746 | 4.40 | | | |
| 8 | −20.292 | 0.50 | 1.80400 | 46.6 | |
| 9 | 45.085 | 0.05 | | | |
| 10 | 19.048 | 1.93 | 1.94595 | 18.0 | |
| 11 | 1,484.667 | (Variable) | | | |
| 12 (Stop) | ∞ | (Variable) | | | |
| 13* | 8.626 | 2.75 | 1.49710 | 81.6 | |
| 14* | −37.442 | 2.59 | | | |

-continued

Unit mm

| | | | | |
|---|---|---|---|---|
| 15 | 26.631 | 0.40 | 1.80610 | 33.3 |
| 16 | 8.839 | 0.91 | | |
| 17* | 16.419 | 1.88 | 1.49710 | 81.6 |
| 18* | −20.554 | 1.60 | | |
| 19 | ∞ | (Variable) | (Flare cut stop) | |
| 20* | −31.140 | 0.70 | 1.53160 | 55.8 |
| 21* | 26.925 | (Variable) | | |
| 22 | 16.993 | 2.90 | 1.53160 | 55.8 | 0.5672 |
| 23 | −20.141 | 0.30 | | |
| 24 | −24.266 | 0.70 | 1.63540 | 23.9 | 0.6353 |
| 25 | −59.034 | (Variable) | | |
| 26 | ∞ | 1.00 | 1.51633 | 64.1 |
| 27 | ∞ | 0.53 | | |
| Image plane | ∞ | | | |

Aspherical surface data

Thirteenth surface

K = −2.78153e−001  A4 = −8.15659e−005  A6 = −3.38954e−006
A8 = −3.59757e−008

Fourteenth surface

K = 0.00000e+000  A4 = 1.05237e−004  A6 = −5.31712e−006

Seventeenth surface

K = 0.00000e+000  A4 = −2.91488e−005  A6 = −1.81455e−006

Eighteenth surface

K = 0.00000e+000  A4 = −3.11360e−005  A6 = 2.09343e−007

Twentieth surface

K = −2.74527e−001  A4 = 2.28656e−005

Twenty-first surface

K = 1.00918e+000  A4 = 5.25368e−005

Various data
Zoom ratio 43.24

| | Wide angle | Intermediate | Telephoto |
|---|---|---|---|
| Focal length | 4.38 | 12.22 | 189.50 |
| F-number | 3.51 | 4.52 | 6.80 |
| Half angle of view (degree) | 35.95 | 17.59 | 1.17 |
| Total lens length | 83.53 | 85.30 | 128.43 |
| BF | 7.58 | 14.42 | 5.74 |
| d5 | 0.80 | 15.56 | 59.68 |
| d11 | 30.40 | 9.59 | 1.41 |
| d12 | 7.86 | 6.47 | 0.49 |
| d19 | 2.85 | 4.31 | 11.18 |
| d21 | 3.00 | 3.92 | 18.91 |
| d25 | 6.39 | 13.23 | 4.55 |

Zoom lens unit data

| Unit | First surface | Focal length |
|---|---|---|
| 1 | 1 | 77.77 |
| 2 | 6 | −8.57 |
| 3 | 13 | 15.93 |
| 4 | 20 | −27.05 |
| 5 | 22 | 23.97 |

Numerical Embodiment 3

Unit mm

Surface Data

| Surface number i | ri | di | ndi | vdi | θgFi |
|---|---|---|---|---|---|
| 1 | 102.915 | 1.20 | 1.83400 | 37.2 | |
| 2 | 44.373 | 4.79 | 1.49700 | 81.5 | |
| 3 | −154.375 | 0.05 | | | |
| 4 | 36.680 | 3.05 | 1.48749 | 70.2 | |
| 5 | 114.337 | (Variable) | | | |
| 6 | 504.493 | 0.60 | 1.83481 | 42.7 | |
| 7 | 7.748 | 4.40 | | | |
| 8 | −20.295 | 0.50 | 1.80400 | 46.6 | |
| 9 | 45.122 | 0.05 | | | |
| 10 | 19.033 | 1.93 | 1.94595 | 18.0 | |
| 11 | 1,544.942 | (Variable) | | | |
| 12 (Stop) | ∞ | (Variable) | | | |
| 13* | 8.624 | 2.75 | 1.49710 | 81.6 | |
| 14* | −37.409 | 2.61 | | | |
| 15 | 26.608 | 0.40 | 1.80610 | 33.3 | |
| 16 | 8.842 | 0.98 | | | |
| 17* | 16.417 | 1.56 | 1.49710 | 81.6 | |
| 18* | −20.552 | 1.60 | | | |
| 19 | ∞ | (Variable) | (Flare cut stop) | | |
| 20* | −30.283 | 0.70 | 1.53160 | 55.8 | |
| 21* | 26.328 | (Variable) | | | |
| 22 | 17.460 | 2.90 | 1.53160 | 55.8 | 0.5672 |
| 23 | −21.988 | 0.30 | | | |
| 24 | −25.624 | 0.70 | 2.10205 | 16.8 | 0.6721 |
| 25 | −33.598 | (Variable) | | | |
| 26 | ∞ | 1.00 | 1.51633 | 64.1 | |
| 27 | ∞ | 0.54 | | | |
| Image plane | ∞ | | | | |

Aspherical surface data

Thirteenth surface

K = −2.78153e−001  A4 = −7.82789e−005  A6 = −3.21157e−006
A8 = −4.64299e−008

Fourteenth surface

K = 0.00000e+000  A4 = 1.06827e−004  A6 = −5.30889e−006

Seventeenth surface

K = 0.00000e+000  A4 = −3.62509e−005  A6 = −2.23194e−006

Eighteenth surface

K = 0.00000e+000  A4 = −2.85881e−005  A6 = −4.55892e−007

Twentieth surface

K = 6.52233e+000  A4 = 1.17143e−005

Twenty-first surface

K = −2.12791e+000  A4 = 2.80929e−005

Various data
Zoom ratio 43.37

| | Wide angle | Intermediate | Telephoto |
|---|---|---|---|
| Focal length | 4.37 | 12.05 | 189.50 |
| F-number | 3.50 | 4.46 | 6.80 |
| Half angle of view (degree) | 36.02 | 17.82 | 1.17 |
| Total lens length | 83.76 | 85.53 | 128.66 |
| BF | 7.79 | 14.47 | 5.86 |
| d5 | 0.80 | 15.56 | 59.69 |
| d11 | 30.38 | 9.66 | 1.40 |
| d12 | 7.83 | 6.36 | 0.50 |
| d19 | 2.87 | 4.32 | 11.17 |

-continued

Unit mm

| | | | |
|---|---|---|---|
| d21 | 3.02 | 4.09 | 18.98 |
| d25 | 6.59 | 13.27 | 4.66 |

Zoom lens unit data

| Unit | First surface | Focal length |
|---|---|---|
| 1 | 1 | 77.79 |
| 2 | 6 | −8.59 |
| 3 | 13 | 15.88 |
| 4 | 20 | −26.38 |
| 5 | 22 | 22.92 |

Numerical Embodiment 4

Unit mm

Surface Data

| Surface number i | ri | di | ndi | vdi | θgFi |
|---|---|---|---|---|---|
| 1 | 41.603 | 0.82 | 2.00100 | 29.1 | |
| 2 | 23.724 | 4.67 | 1.49700 | 81.5 | |
| 3 | 106.832 | 0.05 | | | |
| 4 | 25.602 | 3.92 | 1.65858 | 43.2 | |
| 5 | 99.892 | (Variable) | | | |
| 6* | 157.224 | 0.40 | 1.85135 | 40.1 | |
| 7* | 5.803 | 2.74 | | | |
| 8 | −17.703 | 0.30 | 1.83481 | 42.7 | |
| 9 | 23.920 | 0.17 | | | |
| 10 | 12.174 | 1.40 | 1.95906 | 17.5 | |
| 11 | 101.566 | (Variable) | | | |
| 12 (Stop) | ∞ | −0.20 | | | |
| 13* | 6.600 | 1.60 | 1.69350 | 53.2 | |
| 14* | −14.514 | 0.05 | | | |
| 15 | 5.075 | 1.40 | 1.51823 | 58.9 | |
| 16 | 29.801 | 0.30 | 2.00100 | 29.1 | |
| 17 | 4.146 | 1.00 | | | |
| 18 | ∞ | (Variable) | (Flare cut stop) | | |
| 19 | 10.887 | 2.17 | 1.53160 | 55.8 | 0.5672 |
| 20 | −20.832 | 0.05 | | | |
| 21 | −23.885 | 0.35 | 1.92286 | 18.9 | 0.6495 |
| 22 | −69.304 | (Variable) | | | |
| 23 | ∞ | 1.00 | 1.51633 | 64.1 | |
| 24 | ∞ | 0.50 | | | |
| Image plane | ∞ | | | | |

Aspherical surface data

Sixth surface

K = −1.53235e+004  A4 = −1.06261e−004  A6 = 2.70933e−005
A8 = −4.21559e−007  A10 = 2.04092e−010

Seventh surface

K = 9.33274e−002  A4 = −5.23477e−004  A6 = 1.11719e−004
A8 = −6.50643e−006  A10 = 3.57126e−007

Thirteenth surface

K = 1.23797e+000  A4 = −1.31907e−003  A6 = 1.66317e−005
A8 = −7.61898e−006  A10 = −5.41705e−007

Fourteenth surface

K = 1.36548e+001  A4 = 4.52502e−004  A6 = 8.82187e−005
A8 = −1.29707e−005

-continued

Unit mm

Various data
Zoom ratio 20.13

| | Wide angle | Intermediate | Telephoto |
|---|---|---|---|
| Focal length | 4.37 | 10.56 | 88.00 |
| F-number | 3.60 | 4.69 | 7.10 |
| Half angle of view (degree) | 37.00 | 20.16 | 2.52 |
| Total lens length | 47.85 | 52.83 | 87.24 |
| BF | 3.40 | 8.52 | 3.85 |
| d5 | 0.16 | 8.62 | 38.90 |
| d11 | 16.76 | 7.13 | 1.95 |
| d18 | 6.34 | 7.37 | 21.35 |
| d22 | 2.23 | 7.36 | 2.69 |

Zoom lens unit data

| Unit | First surface | Focal length |
|---|---|---|
| 1 | 1 | 56.83 |
| 2 | 6 | −6.43 |
| 3 | 12 | 10.32 |
| 4 | 19 | 20.40 |

Numerical Embodiment 5

Unit mm

Surface Data

| Surface number i | ri | di | ndi | vdi | θgFi |
|---|---|---|---|---|---|
| 1 | 89.501 | 1.80 | 1.85755 | 43.7 | |
| 2 | 47.351 | 7.80 | 1.49700 | 81.5 | |
| 3 | 379.305 | 0.05 | | | |
| 4 | 49.759 | 6.27 | 1.49700 | 81.5 | |
| 5 | 221.892 | (Variable) | | | |
| 6 | 36.832 | 0.80 | 1.83767 | 45.6 | |
| 7 | 11.564 | 9.66 | | | |
| 8* | −23.471 | 0.50 | 1.58313 | 59.4 | |
| 9 | 33.071 | 0.67 | | | |
| 10 | 28.780 | 1.95 | 1.94595 | 18.0 | |
| 11 | 92.290 | (Variable) | | | |
| 12 | ∞ | −0.10 | (Flare cut stop) | | |
| 13* | 20.888 | 1.87 | 1.85135 | 40.1 | |
| 14* | −239.084 | 0.10 | | | |
| 15 | 25.601 | 2.00 | 1.69350 | 53.2 | |
| 16 | −38.742 | 0.50 | 2.00100 | 29.1 | |
| 17 | 18.207 | 0.57 | | | |
| 18 | 31.353 | 2.10 | 1.57117 | 47.5 | |
| 19 | −27.456 | 0.25 | | | |
| 20 (Stop) | ∞ | (Variable) | | | |
| 21* | −26.500 | 0.50 | 1.85135 | 40.1 | |
| 22 | 11.747 | 2.19 | 1.80518 | 25.5 | |
| 23 | 100.935 | (Variable) | | | |
| 24 | ∞ | 0.50 | (Flare cut stop) | | |
| 25 | 131.031 | 1.56 | 1.59282 | 68.6 | |
| 26 | −32.091 | 0.10 | | | |
| 27 | 38.326 | 0.60 | 2.00713 | 29.3 | |
| 28 | 13.639 | 2.87 | 1.51742 | 52.4 | |
| 29 | −69.290 | 0.10 | | | |
| 30 | 15.238 | 3.60 | 1.48749 | 70.2 | |
| 3.1 | −53.716 | (Variable) | | | |
| 32 | −260.189 | 1.29 | 1.53160 | 55.8 | 0.5672 |
| 33 | 14.161 | 1.32 | | | |
| 34 | 15.625 | 2.23 | 1.63540 | 23.9 | 0.6353 |
| 35 | 17.649 | (Variable) | | | |

-continued

Unit mm

| 36 | ∞ | 1.00 | 1.51633 | 64.1 |
|---|---|---|---|---|
| 37 | ∞ | 0.50 | | |
| Image plane | ∞ | | | |

Aspherical surface data

Eighth surface

K = −1.05182e+000  A4 = −2.91127e−007  A6 = 3.69769e−007
A8 = −1.72141e−008  A10 = 3.40190e−010  A12 = −3.21161e−012
A14 = 1.15396e−014

Thirteenth surface

K = −1.47662e+000  A4 = 1.01518e−005  A6 = −5.66702e−008
A8 = 1.96570e−009  A10 = −1.43592e−011

Fourteenth surface

K = 1.54985e+002  A4 = 5.72996e−006

Twenty-first surface

K = 1.38109e+000  A4 = 1.57705e−005  A6 = 5.69015e−007
A8 = −1.80145e−008  A10 = −2.45361e−010

Various data
Zoom ratio 23.67

| | Wide angle | Intermediate | Telephoto |
|---|---|---|---|
| Focal length | 9.00 | 24.12 | 213.00 |
| F-number | 2.88 | 4.43 | 5.73 |
| Half angle of view (degree) | 36.69 | 18.12 | 2.12 |
| Total lens length | 116.09 | 131.00 | 181.42 |
| BF | 9.88 | 24.00 | 31.76 |
| d5 | 0.85 | 19.16 | 81.21 |
| d11 | 32.42 | 18.34 | 0.70 |
| d20 | 2.82 | 8.85 | 11.37 |
| d23 | 10.95 | 6.07 | 0.30 |
| d31 | 5.49 | 0.91 | 2.41 |
| d35 | 8.72 | 22.84 | 30.60 |

Zoom lens unit data

| Unit | First surface | Focal length |
|---|---|---|
| 1 | 1 | 118.40 |
| 2 | 6 | −13.02 |
| 3 | 12 | 20.74 |
| 4 | 21 | −22.48 |
| 5 | 24 | 16.98 |
| 6 | 32 | −28.92 |

Next, an embodiment of a digital still camera in which the zoom lens as described in each of Embodiments is used as an image pickup optical system is described with reference to FIG. 11.

Figure 11:
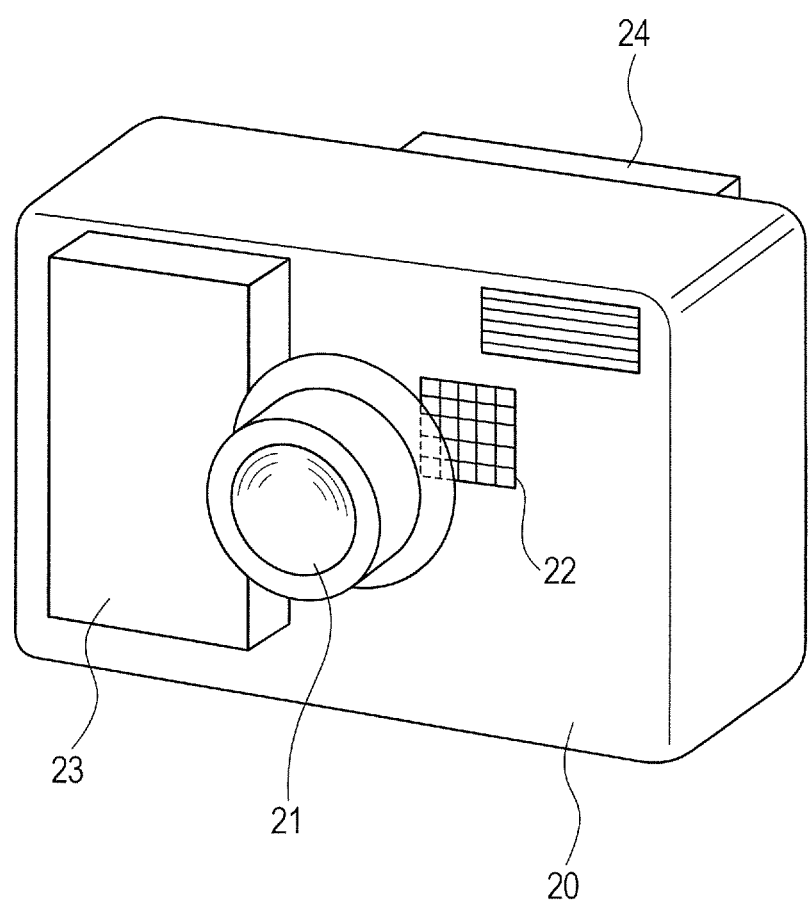
FIG. 11 is a schematic view of a main part of an image pickup apparatus according to the present invention.

In FIG. 11, the digital still camera includes a camera main body 20 and an image pickup optical system 21 including the zoom lens described in any one of Embodiments 1 to 5. A solid-state image pickup element (photoelectric conversion element) 22, such as a CCD sensor or a CMOS sensor, is included in the camera main body to receive a subject image formed by the image pickup optical system 21. A memory 23 records information corresponding to a subject image that has been photoelectrically converted by the solid-state image pickup element 22. A viewfinder 24 is formed of a liquid crystal display panel or the like, and is used to observe the subject image formed on the solid-state image pickup element 22.

As described above, the zoom lens of the present invention is applied to an image pickup apparatus such as a digital still camera, thereby being capable of obtaining an image pickup apparatus including a small zoom lens having a wide angle of view, a high zoom ratio, and high optical performance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-009250, filed Jan. 21, 2015, which is hereby incorporated by reference herein in its entirety.

What is claimed is:

1. A zoom lens comprising, in order from an object side to an image side:
    a first lens unit having a positive refractive power;
    a second lens unit having a negative refractive power;
    a third lens unit having a positive refractive power; and
    a rear lens group including at least one lens unit,
    wherein an interval between each pair of adjacent lens units is changed during zooming,
    wherein a lens unit arranged closest to the image side includes at least two lenses,
    wherein materials of all of lenses included in the lens unit arranged closest to the image side comprise a material satisfying the following conditional expression:

$$0.0 < \theta gFr - (-1.520 \times 10^{-7} \times vdr^3 + 5.213 \times 10 \times vdr^2 - 5.500 \times 10^{-3} \times vdr + 0.730),$$

TABLE 1

| | | | Embodiment | | | | |
|---|---|---|---|---|---|---|---|
| | Conditional Expression | | 1 | 2 | 3 | 4 | 5 |
| (1) | $\theta gFr - (-1.520 \times 10^{-7} \times vdr^3 + 5.213 \times 10^{-5} \times vdr^2 - 5.500 \times 10^{-3} \times vdr + 0.730)$ | Positive lens | 0.0112 | 0.0112 | 0.0112 | 0.0112 | 0.0112 |
| | | Negative lens | 0.0019 | 0.0102 | 0.0212 | 0.0068 | 0.0102 |
| (2) | f1/fw | | 17.74 | 17.75 | 17.8 | 13.00 | 13.15 |
| (3) | ft/f1 | | 2.44 | 2.44 | 2.44 | 1.55 | 1.80 |
| (4) | ft/f2 | | −22.11 | −22.10 | −22.07 | −13.68 | −16.36 |
| (5) | ft/f3 | | 11.90 | 11.90 | 11.94 | 8.53 | 10.27 |
| (7) | vdrp | | 55.80 | 55.80 | 55.80 | 55.80 | 55.80 |
| (8) | vdrn | | 22.8 | 23.9 | 16.8 | 18.9 | 23.9 |
| (9) | m1/fw | | −10.25 | −10.25 | −10.28 | −9.01 | −7.26 |
| (10) | m3/fw | | −5.09 | −5.11 | −5.11 | −3.54 | −0.91 |
| (11) | ft/|fr| | | 7.93 | 7.91 | 8.27 | 4.31 | 7.36 |
| (12) | Ndrn | | 1.808095 | 1.6355 | 2.10205 | 1.92286 | 1.6355 | where θgFr and νdr represent relative partial dispersion and an Abbe number of the material of the lens included in the lens unit arranged closest to the image, and wherein the following conditional expression is satisfied:

$$12.0 < f1/fw < 40.0,$$

where f1 represents a focal length of the first lens unit, and fw represents a focal length of the zoom lens at a wide angle end.

2. The zoom lens according to claim 1, wherein the following conditional expression is satisfied:

$$1.5 < ft/f1 < 5.0,$$

where ft represents a focal length of the zoom lens at a telephoto end.

3. The zoom lens according to claim 1, wherein the following conditional expression is satisfied:

$$-30.0 < ft/f2 < -5.0,$$

where f2 represents a focal length of the second lens unit, and ft represents a focal length of the zoom lens at a telephoto end.

4. The zoom lens according to claim 1, wherein the following conditional expression is satisfied:

$$5.0 < ft/f3 < 20.0,$$

where f3 represents a focal length of the third lens unit, and ft represents a focal length of the zoom lens at a telephoto end.

5. The zoom lens according to claim 1, wherein the materials of the all of lenses included in the lens unit arranged closest to the image side comprise a material satisfying the following conditional expression:

$$10.0 < \nu dr < 100.0,$$

where νdr represents the Abbe number of the material of the lens included in the lens unit arranged closest to the image side.

6. The zoom lens according to claim 1, wherein the following conditional expression is satisfied:

$$40.0 < \nu drp < 100.0,$$

where νdrp represents an Abbe number of a material of a positive lens included in the lens unit arranged closest to the image side.

7. The zoom lens according to claim 1, wherein the following conditional expression is satisfied:

$$10.0 < \nu drn < 40.0,$$

where νdrn represents an Abbe number of a material of a negative lens included in the lens unit arranged closest to the image side.

8. The zoom lens according to claim 1, wherein the following conditional expression is satisfied:

$$-30.0 < m1/fw < -3.0,$$

where m1 represents a movement amount of the first lens unit during zooming from the wide angle end to a telephoto end.

9. The zoom lens according to claim 1, wherein the following conditional expression is satisfied:

$$-10.0 < m3/fw < -0.5,$$

where m3 represents a movement amount of the third lens unit during zooming from the wide angle end to a telephoto end.

10. The zoom lens according to claim 1, wherein the following conditional expression is satisfied:

$$2.0 < ft/|fr| < 15.0,$$

where fr represents a focal length of the lens unit arranged closest to the image side, and ft represents a focal length of the zoom lens at a telephoto end.

11. The zoom lens according to claim 1, wherein the following conditional expression is satisfied:

$$1.6 < Ndrn < 2.3,$$

where Ndrn represents a refractive index of a material of a negative lens included in the lens unit arranged closest to the image side.

12. The zoom lens according to claim 1, wherein the lens unit arranged closest to the image side consists of one positive lens and one negative lens arranged with an air gap.

13. The zoom lens according to claim 1, configured to form an image on a solid-state image pickup element.

14. An image pickup apparatus, comprising:
a zoom lens comprising, in order from an object side to an image side:
a first lens unit having a positive refractive power;
a second lens unit having a negative refractive power;
a third lens unit having a positive refractive power; and
a rear lens group including at least one lens unit,
wherein an interval between each pair of adjacent lens units is changed during zooming,
wherein a lens unit arranged closest to the image side includes at least two lenses,
wherein materials of all of lenses included in the lens unit arranged closest to the image side comprise a material satisfying the following conditional expression:

$$0.0 < \theta gFr - (-1.520 \times 10^{-7} \times \nu dr^3 + 5.213 \times 10^{-5} \times \nu dr^2 - 5.500 \times 10^{-3} \times \nu dr + 0.730),$$

where θgFr and νdr represent relative partial dispersion and an Abbe number of the material of the lens included in the lens unit arranged closest to the image, respectively, and wherein the following conditional expression is satisfied:

$$12.0 < f1/fw < 40.0,$$

where f1 represents a focal length of the first lens unit, and fw represents a focal length of the zoom lens at a wide angle end; and a solid-state image pickup element configured to receive light of an image formed by the zoom lens.

* * * * *